US012659318B2

(12) United States Patent
Singh et al.

(10) Patent No.: US 12,659,318 B2
(45) Date of Patent: Jun. 16, 2026

(54) LOCATION-AWARE MULTI-FACTOR AUTHENTICATION FOR VIRTUAL MACHINE USERS

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/635,673

(22) Filed: Apr. 15, 2024

(65) Prior Publication Data

US 2025/0323920 A1     Oct. 16, 2025

(51) Int. Cl.
*H04L 9/40* (2022.01)
*G06F 9/455* (2018.01)

(52) U.S. Cl.
CPC ........ *H04L 63/107* (2013.01); *G06F 9/45558* (2013.01); *H04L 63/08* (2013.01); *G06F 2009/45587* (2013.01)

(58) Field of Classification Search
CPC ... H04L 63/107; H04L 63/08; G06F 9/45558; G06F 2009/45587
See application file for complete search history.

(56) References Cited

U.S. PATENT DOCUMENTS 9,734,325 B1 *  8/2017  Neumann ............. H04L 9/0866
10,509,663 B1 *  12/2019  Unnikrishnan ..... G06F 9/45558

2011/0004680 A1 *   1/2011  Ryman ................... G06F 9/452
                                                      709/227
2011/0239213 A1 *   9/2011  Aswani .............. G06F 9/45558
                                                      718/1
2013/0086550 A1 *   4/2013  Epstein .................. G06F 9/455
                                                      717/110
2013/0185717 A1 *   7/2013  Lakshminarayanan .....................
                                                      G06F 9/45558
                                                      718/1
2013/0297802 A1 *  11/2013  Laribi ................. H04L 12/6418
                                                      709/226
2014/0325515 A1 *  10/2014  Salmela ................ G06F 9/4856
                                                      718/1
2015/0128221 A1 *   5/2015  Cao ........................ H04L 63/083
                                                      726/4
2017/0147819 A1 *   5/2017  Vasilenko ............. G06F 21/577
(Continued)

*Primary Examiner* — Javier O Guzman

(74) *Attorney, Agent, or Firm* — Jackson Walker L.L.P.

(57)               ABSTRACT

Disclosed systems and methods provide location-aware multi-factor authentication for VM users in combination with the prohibited users lists and disconnecting VMs based on user behavior or activity. Implementations may employ a hypervisor enabled by a lightweight, secure operating system (LSOS) as a foundational, enabling, and OS-agnostic technology for multiple uses cases. An LSOS authenticator module may generate IP location based authentication number for user authentication. An OEM Secure VM manager in Domain0 (Dom0) of a Xen cloud computing model may monitor user activity while Secure OEM Hypercall communication is employed for all communication from VM to LSOS. Embodiments may employ a LSOS VM prohibited users module and hypervisor action module to remove users and destroy VMs based on data received from Dom0, VM Manager and the user module in the VM.

20 Claims, 3 Drawing Sheets

(56) References Cited

U.S. PATENT DOCUMENTS

| | | | | |
|---|---|---|---|---|
| 2019/0370049 A1* | 12/2019 | Gopalan | ............. | G06F 9/45558 |
| 2020/0404002 A1* | 12/2020 | Patel | ...................... | G06F 40/30 |
| 2021/0058306 A1* | 2/2021 | Szigeti | ............... | H04L 41/0686 |
| 2021/0105275 A1* | 4/2021 | Bansal | ............... | H04L 63/0281 |
| 2021/0117249 A1* | 4/2021 | Doshi | .................... | G06F 9/547 |
| 2022/0171648 A1* | 6/2022 | Rodriguez | .......... | G06F 9/45533 |

* cited by examiner

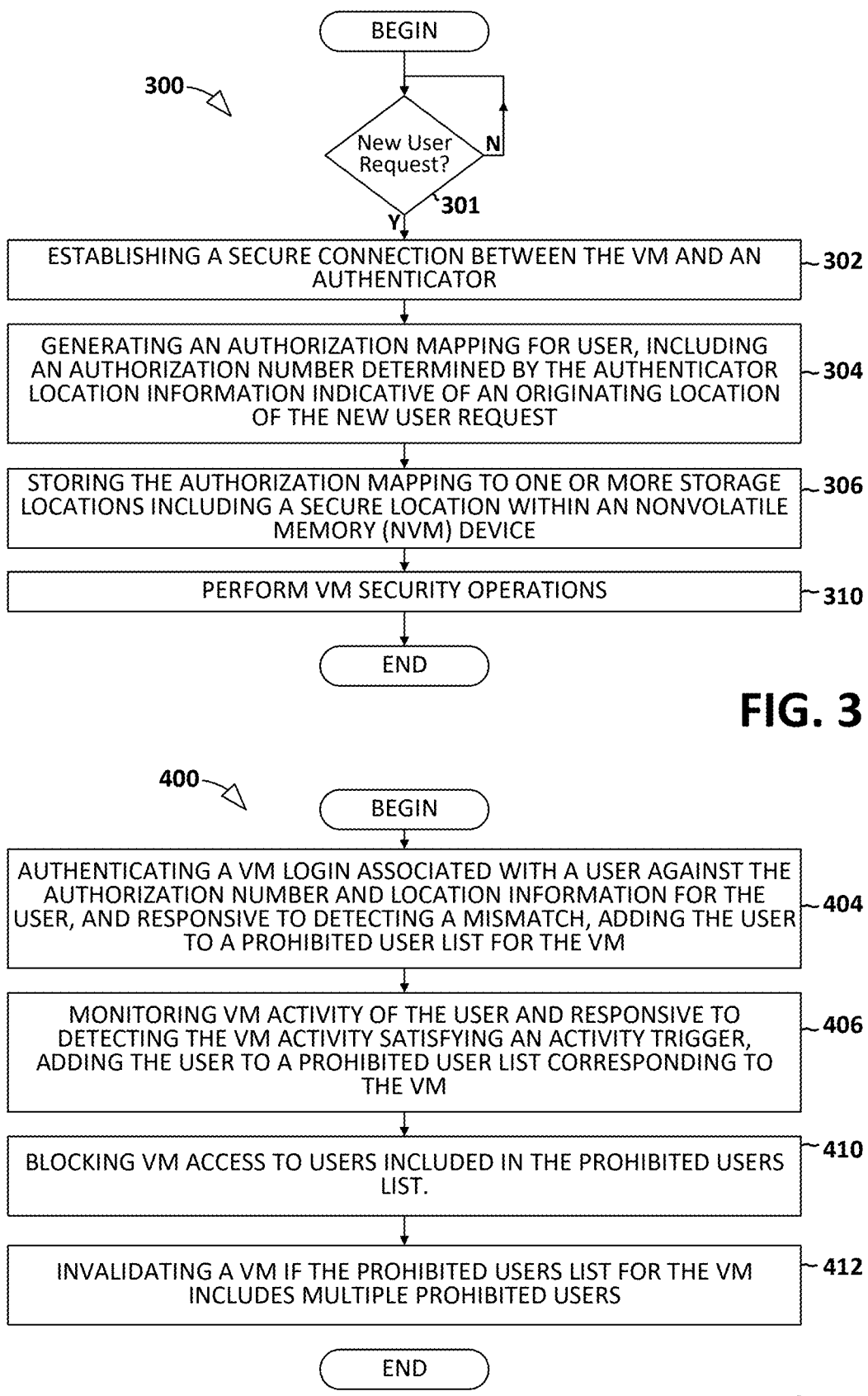

300

BEGIN

New User
Request?     N

301

Y

ESTABLISHING A SECURE CONNECTION BETWEEN THE VM AND AN AUTHENTICATOR     302

GENERATING AN AUTHORIZATION MAPPING FOR USER, INCLUDING AN AUTHORIZATION NUMBER DETERMINED BY THE AUTHENTICATOR LOCATION INFORMATION INDICATIVE OF AN ORIGINATING LOCATION OF THE NEW USER REQUEST     304

STORING THE AUTHORIZATION MAPPING TO ONE OR MORE STORAGE LOCATIONS INCLUDING A SECURE LOCATION WITHIN AN NONVOLATILE MEMORY (NVM) DEVICE     306

PERFORM VM SECURITY OPERATIONS     310

END

BEGIN

AUTHENTICATING A VM LOGIN ASSOCIATED WITH A USER AGAINST THE AUTHORIZATION NUMBER AND LOCATION INFORMATION FOR THE USER, AND RESPONSIVE TO DETECTING A MISMATCH, ADDING THE USER TO A PROHIBITED USER LIST FOR THE VM     404

MONITORING VM ACTIVITY OF THE USER AND RESPONSIVE TO DETECTING THE VM ACTIVITY SATISFYING AN ACTIVITY TRIGGER, ADDING THE USER TO A PROHIBITED USER LIST CORRESPONDING TO THE VM     406

BLOCKING VM ACCESS TO USERS INCLUDED IN THE PROHIBITED USERS LIST.     410

INVALIDATING A VM IF THE PROHIBITED USERS LIST FOR THE VM INCLUDES MULTIPLE PROHIBITED USERS     412

END

FIG. 4

LOCATION-AWARE MULTI-FACTOR AUTHENTICATION FOR VIRTUAL MACHINE USERS

TECHNICAL FIELD

The present disclosure is in the field of information handling system security and, more specifically, multi-factor authentication for virtual machine users.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Virtualization plays an important role in modern cloud computing. Virtualization may include or employ a hypervisor. Hypervisors may support and facilitate launching one or more operating systems to run a host device and one or more operating systems to run on a (VMV) where the VM is supervised by the hypervisor. In such environments, authentication, authorization, and communication channels are significant security concerns. Examples of security threats to VM/Hypervisor platforms include VM attacks, in which the network surface is used by the user to connect and communicate using malware injection, denial of service attacks (DoS) focusing on high-volume network traffic and packets to negatively impact resource availability, Man-in-the-middle attacks aimed at communication between two VMs using Address Resolution Protocol (ARP) spoofing, and Authentication vulnerabilities: Authentication attacks like password spraying attacks, credential stuffing attacks, dictionary attacks, are brute force attacks. Accordingly, it is desirable to implement one or more solutions to address these issues.

SUMMARY

Vulnerability issues described above are addressed by disclosed systems, methods, features, and services for providing location-aware, multi-factor authentication for VM users in combination with the use of a prohibited users list and invalidating or otherwise terminating VMs based on user behavior or activity. Implementations may include functionality enabled by a lightweight secure operating system, generically referred to herein as the lightweight operating system (LSOS) as a foundational, enabling, and OS-agnostic technology for multiple use cases regardless of the host OS.

In at least some embodiments, an authentication module in the LSOS generates IP location based authentication number for user authentication. An OEM secure VM manager in Domain0 (Dom0) of a Xen hypervisor may monitor user activity while secure OEM hypercall communication is employed for all communication between VM and LSOS. Embodiments may employ a VM prohibited users list module in the LSOS and an action module in the hypervisor to remove or otherwise block users and/or terminate VMs based on data received from the OEM Secure VM Manager in Dom0 and the VM user module.

In one aspect, disclosed system and methods for implementing location-aware multi-factor authentication for VM users, upon detecting a request to add a new user as an authorized user of a VM associated with a hypervisor running on an information handling system, establish a secure connection between the VM and an authenticator, generate an authorization data tuple, referred to herein as an authorization mapping, corresponding to the user, and store the authorization mapping to one or more storage locations. In at least one embodiment, the authorization mapping is stored in two locations including (1) a secure location within an nonvolatile memory (NVMd) device of the information handling system and (2) a user module within the VM. The elements of the authorization mapping may include an authorization number determined by the authenticator and location information indicative of an originating location of the new user request. At least some embodiments may use an IP address associated with the new user request as a proxy for the originating location.

Disclosed systems and methods further include performing certain VM security operations including, as non-limiting examples, login authorization operations and VM activity operations. Disclosed login authorization operations may include detecting a VM login sequence associated with a user and performing a two-factor authentication based on the authorization number provided to the user and the location data derived from the login request. Upon detecting a mismatch or other type of exception, the user and/or information associated with user is added to a VM prohibited user list.

Monitoring VM activity of the user may include monitoring the user's VM activity for suspicious activity, sometimes referred to herein as triggering activity. Common examples of VM activities that an administrator may wish to designate as suspicious activity include sending multiple requests to an API or the like and network traffic volume exceeding a predetermined maximum network volume.

In response to detecting the VM activity satisfying an activity trigger, the user may be added to a prohibited user list for the VM. If multiple users of the VM are flagged for either invalid login credentials or suspicious activity, the VM may be invalidated.

VM activity may be monitored by a VM manager in secure communication with the hypervisor and configured to monitor activity of all users of the VM.

The hypervisor may be enabled by an underlying LSOS comprised of a base LSOS, including a kernel and a rootfs, retrieved from NVMe storage and an external rootfs retrieved from a cloud software development/management tool such as a Jenkins development platform. The base LSOS may support various use cases including, as an example, a virtualization use case implemented with a Xen hypervisor with the VM manager running in Dom0 of the Xen hypervisor and one or more VMs running in DomU.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow diagram of a VM authentication method disclosed herein;

FIG. 4 illustrates a flow diagram of VM security operations performed by the platform of FIG. 1.

DETAILED DESCRIPTION

Figures 1, 2:
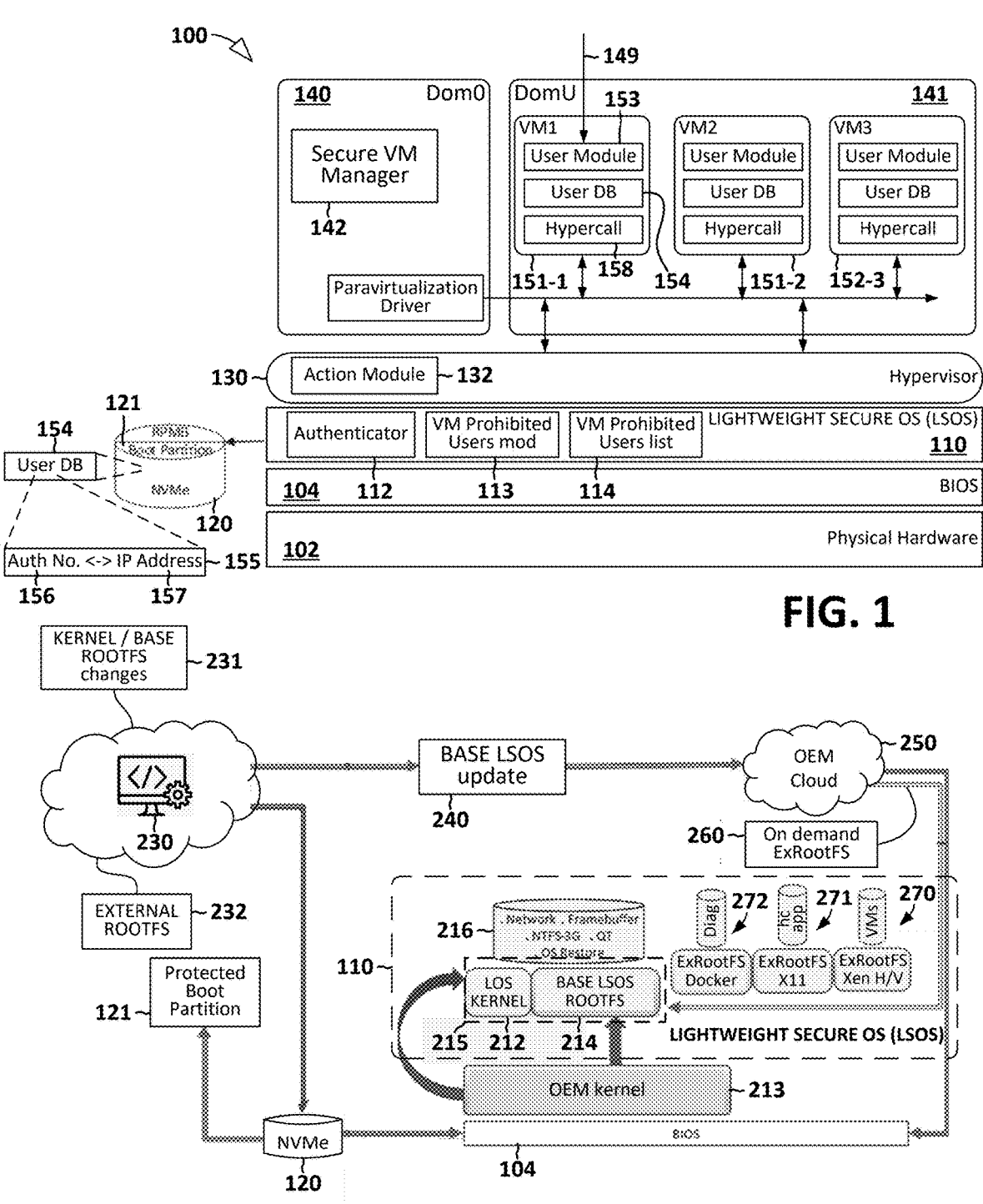
FIG. 1 illustrates a VM platform suitable for use in conjunction with disclosed authenticating VM users.
FIG. 2 illustrates an exemplary lightweight secure operating system (LSOS) enabling the VM platform of FIG. 1.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Turning now to the drawings, FIG. 1 illustrates an exemplary VM platform 100 featuring location-based two-factor authentication during VM login in combination with activity monitoring, a prohibited user list, and policies or practices for invalidating a VM. The VM platform 100 depicted in FIG. 1 includes physical hardware 102, a BIOS 104, and an LSOS 110 enabling a hypervisor 130.

The hypervisor 130 illustrated in FIG. 1 may be implemented as a Xen hypervisor that features two distinct domains including a domain 0 (Dom) 140 and a domain U 141 wherein Dom0 140 includes hardware access privileges while DomU lacks such privileges. As depicted in FIG. 1, a secure VM manager 142 executes within Dom0 140 while the VMs 151, three of which are depicted in FIG. 1 as VM1 151-1, VM2 151-2, and VM3 151-3 execute within DomU

141. Each VM 151 depicted in FIG. 1 includes a user module 153 and means for initiating secure hypercalls 158 to hypervisor 130.

When a new user request 149 is received from a user seeking to be added as an authorized user to a VM, the user module 153 in the applicable VM 151 will communicate with the authenticator 112 in LSOS 110 via a secure hypercall 158. Authenticator 112 may generate a 2-tuple data structure, referred to herein as an authentication mapping 155, for the new user. Authentication mappings 155 may include an authentication number 156 assigned by authenticator 112 and location information 157 indicative of a geographic origin of the new user request. In at least some embodiments, the location information may include an IP location associated with the new user request, e.g., an originating IP address of the new user request.

The authentication mapping may be stored in one or more locations including a secure storage location of the information handling system. Some embodiments may store authorization mappings to a user database in two locations including a user database stored in a secure boot partition of an RPMB-compatible NVMe 120 and a user database stored in VM user module 153.

Whenever a user attempting to login to a VM 151 presents an authorization number, VM user module 153 provides a first level of security check by indexing or otherwise searching the user database 154 in VM module 153 for an authorization mapping 155 corresponding to the present authorization number. If a mismatch occurs, either because user database 154 does not include an authorization mapping 155 with a matching authorization number or a matching authorization number 156 is found in an authorization mapping 155 that maps authorization number 156 to an IP address 157 that is different than the IP address associated with the login sequence, VM user module 153 will communicate the mismatching authorization number to a VM prohibited users module 113 configured to maintain a VM prohibited users list 114 and the suspect authorization number may be added to the VM prohibited users list 114.

As a second and ongoing security measure against malicious use of VMs 151, secure VM manager 142 may continuously monitor user activity within VM 151 for malicious activity including any user activity not commonly associated with authorized VM users and/or user activity commonly associated with malicious VM users. By way of example, malicious activity may be indicated by multiple co-pending calls or requests to a particular API or other destination, the observance of network traffic exceeding a specified maximum traffic threshold, and any other suitable criteria with which those of ordinary skill in the field of secure computing will be readily familiar. Malicious activity may be defined explicitly by one or more triggering criteria, in which case, malicious activity may be referred to as triggering activity, i.e., activity satisfying one or more triggering criteria. Whenever, triggering activity is detected by VM manager 142, VM manager 142 will inform VM prohibited users module 113 and the applicable user will be added to the VM prohibited users list 114.

In this manner, the VM prohibited users list 114 may include a list of suspicious users for the corresponding VM 151. An action module 132 in hypervisor 130 may be triggered periodically or each time a suspicious user is added to VM prohibited users list 114 to block that user from accessing VM 151. In addition, in at least some embodiments, if multiple suspicious users are identified from the same VM, then the VM Blacklist module may inform hypervisor action module 132 to terminate, invalidate, or otherwise eliminate the VM.

Turning now to FIG. 2, the LSOS 110 of FIG. 1 is illustrated in additional detail. The LSOS 110 depicted in FIG. 2 comprises a lightweight (<100 MB), secure operating system suitable for enabling a variety of functions or use cases, independent of the host OS and agnostic with respect to the underlying silicon. LSOS 110 may be feature one or more OEM-specific features supporting, as examples, OEM-specific hypercalls for platform and peripheral management, an OEM cloud control play for deployment, configuration, and service, and an independent channel for OEM offerings to connect OEM hardware with an OEM cloud.

The LSOS 110 depicted in FIG. 2 includes a base LSOS 215, including a kernel 212 and a base LSOS rootfs 214, retrieved from a secure partition in NVMe 120 by BIOS 104, and one or more external rootfs instances available on-demand for enabling specific functionality. The base LSOS 215 in FIG. 2 may include at least some OEM-specific features of a custom OEM kernel 213. Base LSOS 215 may enable various utility applications 216 including, in the illustrated example, graphical display utilities such as Linux framebuffer, file system drivers such as NTFS-3g, etc.

The exemplary external rootfs instances depicted in FIG. 2 include an external rootfs 270 enabling a Xen hypervisor for providing VM functionality, an X11 rootfs 271 for a hybrid client application 271, and an external rootfs 272 enabling a diagnostic application. The illustrated external rootfs instances and other embodiments may include or support more, fewer, and/or different external rootfs examples.

As depicted in FIG. 2, a software development/management platform 230, e.g., Jenkins, delivers kernel and base rootfs changes/updates 231 as base LSOS updates 240 via an OEM cloud 250. The illustrated platform 230 also receives uploads of external rootfs instances 232 and delivers them as on-demand external rootfs 260 via OEM cloud 250.

Referring now to FIG. 3, a flow diagram illustrates an exemplary method 300 for location-aware authentication of VM users in accordance with disclosed subject matter. In at least some embodiments, method 300 may be entirely or partially performed by a VM platform such as the VA platform 100 (FIG. 1) including a LSOS such as the LSOS 110 of FIG. 2.

As depicted in FIG. 3, method 300 begins when a new user request is detected (step 301). The new user request may include any request to add a new user as an authorized user of a VM associated with a hypervisor running on an information handling system.

Upon detecting a new user request, the method illustrated in FIG. 3 establishes (step 302) a secure connection between a VM and an authenticator. The authenticator may then generate (step 304) an authorization mapping for the user. As indicated previously, an authorization mapping may comprise a tuple of two elements including an authorization number determined by the authenticator and location information indicative of an originating location of the new user request.

The method 300 of FIG. 3 further includes storing (step 306) the authorization mapping to one or more storage locations including a secure location within an nonvolatile memory (NVMV) device of the information handling system. The illustrated method then performs (operation 310) security operations, as described in the method 400 of FIG. 4, to prevent unauthorized users from gaining access to a VM.

Referring now to FIG. 4, a flow diagram illustrates an exemplary method 400 for performing the security operations (310) of FIG. 3. The illustrated method 400 includes authenticating (step 404) users logging into the VM and monitoring (step 406) VM activity associated with each user of the VM. The user authentication (step 404) illustrated in FIG. 4 employs two factor authentication based on the assigned authorization number and the location information mapped to the authorization number in the applicable authorization mapping. Monitoring VM activity of a user includes detecting user activity satisfying an activity trigger and adding the user to a prohibited user list corresponding to the VM. The method 400 of FIG. 4 further includes blocking (operation 410) VM access to users included in the prohibited users list. In addition, if the number of prohibited users for a VM exceeds a specified limit, the illustrated method 400 may then invalidate (412) the VM. In at least some instances, the specified number of users may be 1, 2, or another suitable value.

Figure 5:
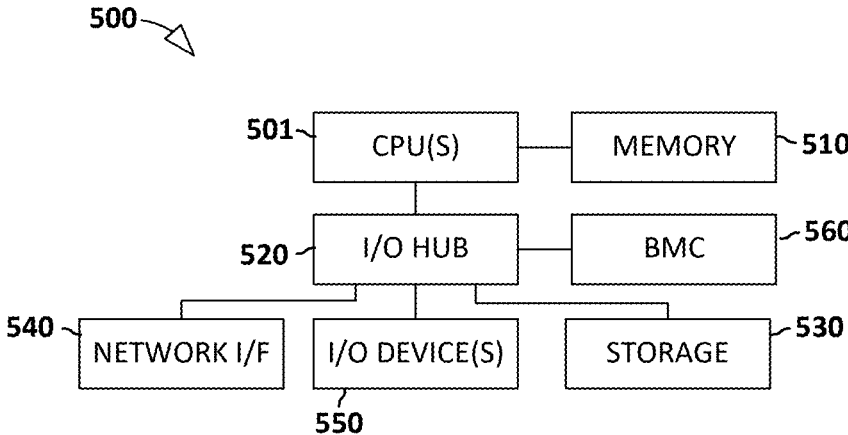
FIG. 5 illustrates an exemplary information handling system suitable for use in conjunction with FIGS. 1-4.

Referring now to FIG. 5, any one or more of the elements illustrated in FIG. 1 through FIG. 2 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:

responsive to a new user request to add a user as an authorized user of a virtual machine (VM) associated with a hypervisor running on an information handling system:

issuing, by the VM, a secure hypercall to establish a secure connection between the VM and an authenticator;

generating, by the authenticator, an authorization mapping for the user, wherein the authorization mapping is a 2-tuple data structure including:

an authorization number determined by the authenticator and;

location information indicative of an originating location of the new user request; and storing the authorization mapping to a replay protected memory block (RPMB) within a secure boot partition of a nonvolatile memory (NVM) device of the information handling system; and performing VM security operations including:

authenticating a VM login associated with the user against the authorization number and the location information corresponding to the user and responsive to detecting a mismatch, adding the user to a prohibited user list for the VM;

monitoring VM activity of the user and responsive to detecting the VM activity satisfying an activity trigger, adding the user to a prohibited user list corresponding to the VM; and blocking VM access to users included in the prohibited users list.

2. The method of claim 1, wherein the location information comprises an IP address corresponding to the new user request.

3. The method of claim 1, further comprising storing the authorization mapping to a user database within the a user module of the VM.

4. The method of claim 1, wherein monitoring VM activity comprises monitoring VM activity with a VM manager in secure communication with the hypervisor and configured to monitor activity of all users of the VM.

5. The method of claim 1, wherein the hypervisor comprise a Xen hypervisor.

6. The method of claim 5, wherein the VM manager executes in a domain 0(Dom0) of the Xen hypervisor.

7. The method of claim 5, wherein the hypervisor is enabled by a secure, lightweight operating system (OS) including:

a kernel and base rootfs retrieved from the NVM device; and an external rootfs retrieved from a cloud software development platform.

8. The method of claim 7, wherein the authenticator runs in the lightweight OS.

9. The method of claim 1, wherein satisfying the activity trigger includes any one or more of:

multiple requests from a single VM; and network traffic exceeding a maximum permitted traffic volume.

10. The method of claim 1, wherein the VM security operations include terminating the VM upon detecting activity satisfying the activity trigger for multiple users of the VM.

11. An information handling system, comprising:

a central processing unit (CPU);

a memory, including processor executable instructions that, when executed by the CPU, cause the system to perform operations including:

responsive to a new user request to add a user as an authorized user of a virtual machine (VM) associated with a hypervisor running on an information handling system:

issuing, by the VM, a secure hypercall to establish a secure connection between the VM and an authenticator;

generating, by the authenticator, an authorization mapping for the user, wherein the authorization mapping is a 2-tuple data structure including:

an authorization number determined by the authenticator and;

location information indicative of an originating location of the new user request; and storing the authorization mapping to a replay protected memory block (RPMB) within a secure boot partition of a nonvolatile memory (NVM) device of the information handling system; and performing VM security operations including:

authenticating a VM login associated with the user against the authorization number and the location information corresponding to the user and responsive to detecting a mismatch, adding the user to a prohibited user list for the VM;

monitoring VM activity of the user and responsive to detecting the VM activity satisfying an activity trigger, adding the user to a prohibited user list corresponding to the VM; and blocking VM access to users included in the prohibited users list.

12. The information handling system of claim 11, wherein the location information comprises an IP address corresponding to the new user request.

13. The information handling system of claim 11, further comprising storing the authorization mapping to a user database within the a user module of the VM.

14. The information handling system of claim 11, wherein monitoring VM activity comprises monitoring VM activity with a VM manager in secure communication with the hypervisor and configured to monitor activity of all users of the VM.

15. The information handling system of claim 11, wherein the hypervisor comprise a Xen hypervisor.

16. The information handling system of claim 15, wherein the VM manager executes in a domain 0(Dom0) of the Xen hypervisor.

17. The information handling system of claim 15, wherein the hypervisor is enabled by a secure, lightweight operating system (OS) including:

a kernel and base rootfs retrieved from the NVM device; and an external rootfs retrieved from a cloud software development platform.

18. The information handling system of claim 17, wherein the authenticator runs in the lightweight OS.

19. The information handling system of claim 11, wherein satisfying the activity trigger includes any one or more of:

multiple requests from a single VM; and network traffic exceeding a maximum permitted traffic volume.

20. The information handling system of claim 11, wherein the VM security operations include terminating the VM upon detecting activity satisfying the activity trigger for multiple users of the VM.

* * * * *